Dec. 21, 1943.  G. D. JONES ET AL  2,337,110
TRACTOR CULTIVATOR
Filed Feb. 23, 1942  3 Sheets-Sheet 1

Inventors
GEORGE DOUGLAS JONES
and EDWARD D. FISHER

Attorneys

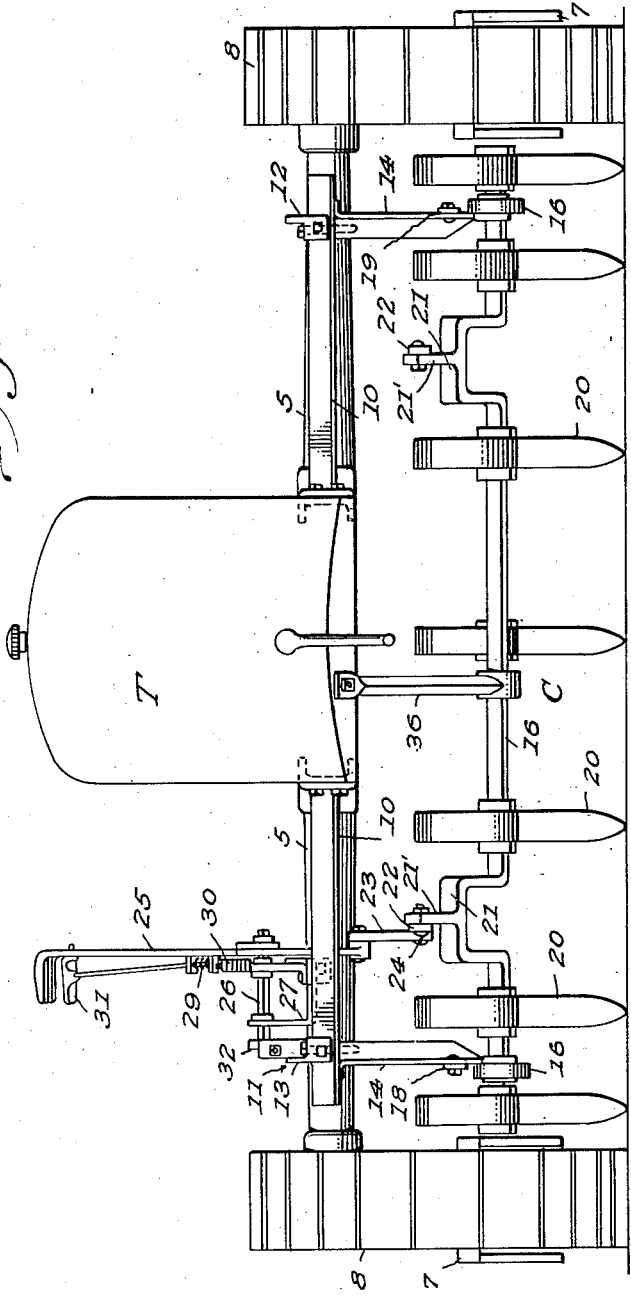

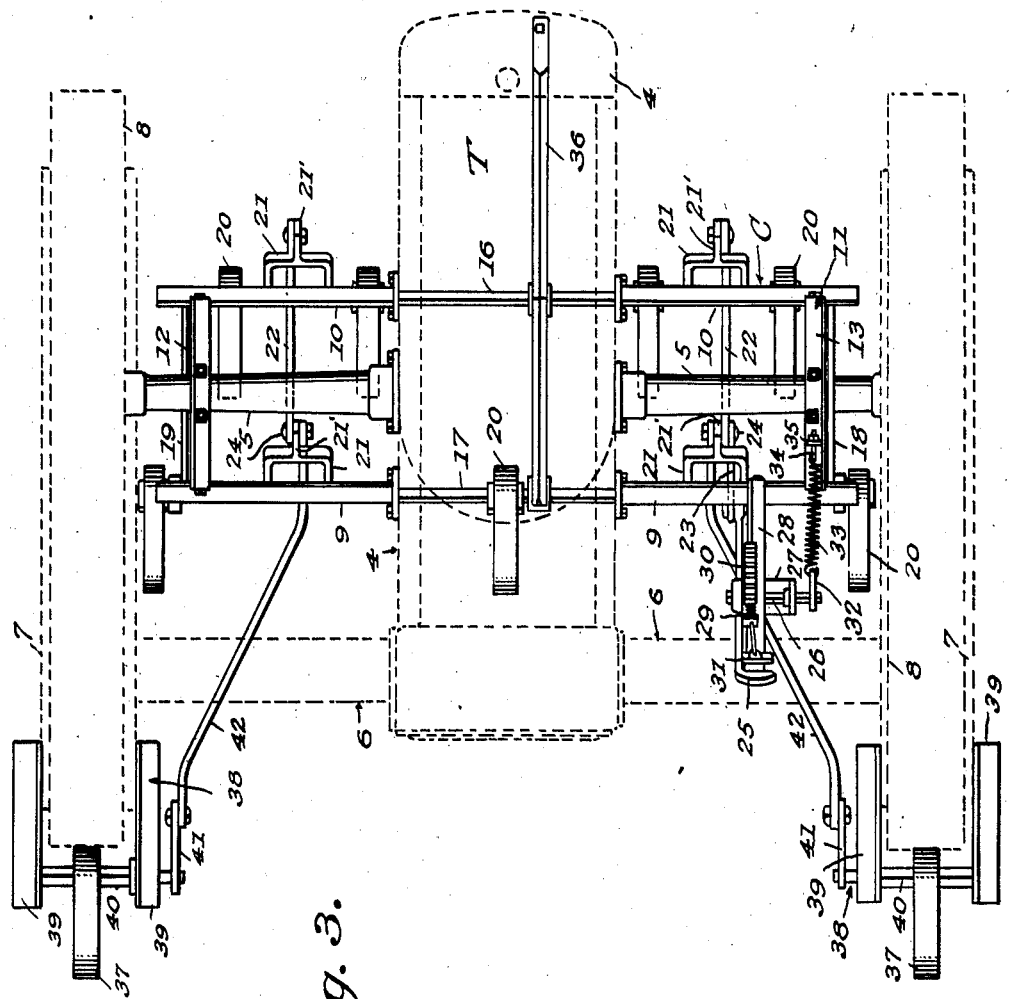

Patented Dec. 21, 1943

2,337,110

UNITED STATES PATENT OFFICE 2,337,110

TRACTOR CULTIVATOR

George Douglas Jones, Baltimore, Md., and Edward D. Fisher, Coudersport, Pa., assignors to The Cleveland Tractor Company, Cleveland, Ohio Application February 23, 1942, Serial No. 432,078

6 Claims. (Cl. 97—47)

This invention relates to cultivators and more particularly to cultivators for use with track laying tractors.

One object of the present invention is the construction of a cultivator or earth working apparatus adapted to be secured and propelled by a "Cletrac" type track laying tractor. The apparatus is rigidly mounted on the tractor in such a manner that the operator has precise control thereover at all times and is enabled to cultivate a crop with ease and without damage to the rows.

Another important object of the invention is the novel arrangement of securing the apparatus to a conventional "Cletrac" tractor and includes the use of the tractor chassis frame, front track suspension members and rear axle housing to support the cultivator whereby two rows of the crop are simultaneously worked with proper soil preparation at the sides and between the rows.

A still further object relates to the proper balancing of the cultivator with relation to the vertical and horizontal center lines of the track laying tractor and the normal pivoting or turning pivot thereof whereby the desired exact control of the digger members is secured by arranging the forward gang of cultivator teeth slightly in advance of the center pivot point of the tractor tracks.

Further objects, advantages and features of invention and construction will appear from the following specification when taken in conjunction with the accompanying drawings, wherein:

Fig. 2 is a front view illustrating the cultivator in position on the tractor and the spacing of the forward gang of spring teeth.

Fig. 3 is a top plan view disclosing the cultivator attachment with its two spaced gangs of cultivator teeth and the rearwardly extending, simultaneously operated tools mounted behind the tracks to cultivate out the compressed soil created by the tractor tracks.

Figure 1:
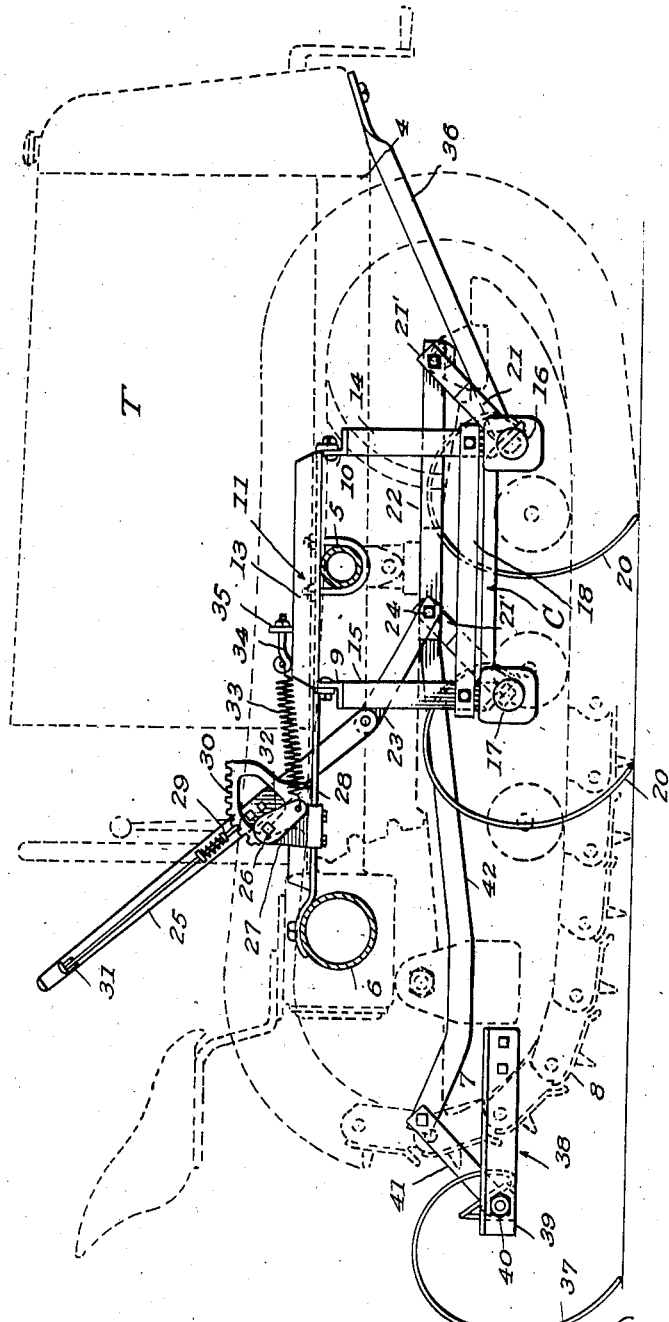
Fig. 1 is a side elevation showing the "Cletrac" type track laying tractor in phantom lines and the cultivator per se with its means of attachment thereto and control in heavy lines.

Referring now to the drawings in detail, wherein similar reference characters designate corresponding parts throughout the several views, the track laying tractor is generally denoted by the letter T and is of the "Cletrac" type. Conventionally, it consists of a chassis frame 4, to which is secured extended front track suspension members 5 and rear axle housings 6 for the drive. The rearwardly pivoted track frames 7 of the endless tracks 8 are arranged on opposite sides of the chassis frame and are forwardly mounted on the front suspension members 5. The conventional means for driving the tracks and general operation of the tractor form no part of the present invention.

The cultivator, generally denoted by the letter C, is adapted to be suspended centrally beneath the tractor and comprises a horizontal supporting frame 11 having parallel side arms 12 and 13 across the top of the members 5. The frame 11 also comprises pairs of horizontal beams 9—9 and 10—10 rigidly connected to the frame and extending laterally therefrom. These beams are supported at their outer extremities by the cross beams 12 and 13 which, in turn, are secured by U-bolts to the front track suspension members 5. Vertical beams 14 and 15 are suspended from the ends of the cross beams 12—13 and serve to support the transverse, spaced, parallel implement bearing rock shafts 16 and 17. Lower cross bars 18—19 rigidly connect the vertical beams 14—15 at their lower ends.

The spaced horizontal rock shafts 16—17 carry the earth working implements or cultivators 20 which are rigidly attached thereto, so that they may be raised and lowered by the rocking or pivoting of the shafts 16—17. These earth working implements are preferably of the curved spring tooth, or tine type, and are adapted to extend forward of these pivot points when in operation.

The mechanism means for rocking the pair of implement bearing shafts 16 and 17 comprises crank portions 21 carrying offset crank arms 21' and link connecting bars 22. These bars connect the crank arms 21' on shafts 16 and 17 for synchronous movement. A link 23 is pivotally fastened at one end to one crank arm 21' and to the link connecting bar 22 as at 24; and at the other end to an operating lever 25.

The operating lever 25 is pivotally mounted intermediate its ends to a shaft 26 which is rockably supported in brackets 27. The brackets 27 are rigidly secured to a rearwardly extending supporting bar 28 fastened to one of the beams 9 and to the rear axle housing 6. The pivoted lever 25 is provided with a spring latch 29 of usual construction, which engages a toothed segment 30 securably fastened to the brackets 27 and controlled by the handle grip 31. Also fastened to the shaft 26 is a crank arm 32 having a contractile coil spring 33 attached thereto, the end of the spring, remote from the crank arm 32, being adjustably connected by means of a bolt 34 to a bracket 35. This bracket 35 in turn is fastened in any suitable manner to the cross beam 13. The spring normally functions to pull the lower end of the lever 25 forwardly and to turn the rock shafts 16 and 17 and thus raise the teeth or spring tines out of the ground. Obviously, the lever 25 may be latched in any selected position for holding the teeth or tines in the ground at the desired angle and depth.

The front rock shaft 16 is shown further supported by a center brace arm 36 which is securely fastened to the front of the chassis frame 4 and, of course, the rear rock shaft 17 can also be supported at its center if desired.

Particular attention is directed to the fact that the front cultivator teeth are disposed directly beneath the tractor on opposite sides of the front suspension members 5 and that the teeth or tines carried by the rock shaft 16 are arranged forwardly of the suspension members 5 and the pivot point of the tracks and consequently slightly beyond the center line of the turning pivot of the tractor.

It is also desirable to work and prepare the soil in the rear of the tracks as the weight of the tractor tends to pack the soil. Therefore, rear teeth or tines 37 are provided. By referring to Fig. 3 it will be noted that single pivoted tines 37 are positioned at the rear of each track 8, being carried on supporting frames 38 having side frame bars 39 bolted or otherwise rigidly fastened to the sides of track frames 7. Each frame 38 supports a rock shaft 40 mounted in bearings carried by the side bars 39 and as clearly shown in Fig. 1, the teeth or tines 37 are securely fastened to the rock shafts 40. Also fastened to each rock shaft is an operating crank link 41 operatively connected to the arms 21' of the crank portions 21 of the rock shaft 17 by extended links 42. Thus the rear tines 37 will be operated synchronously with the front tines.

It will be obvious to those skilled in the art that we have invented a cultivator that is readily adapted to be secured to a crawler type tractor without structural changes therein. The construction and means of attachment of the present apparatus insures complete control of both the cultivator teeth and operation of the tractor as the penetration of the tines may be minutely regulated and the balance of the tractor center pivot and turning point are insured.

We claim:

1. In a tractor of the track laying type, having a chassis and pivoted side track frames, a cultivator attachment therefor including a rigid transverse frame entirely suspended from said chassis between said side track frames, parallel, spaced apart rows of pivoted cultivator teeth carried wholly by said frame and a manually operated linkage arrangement pivoted to said rows of spaced cultivator teeth whereby said teeth may be raised or lowered.

2. In a tractor of the track laying type having a chassis including laterally extending front suspension members and pivoted side track carrying frames supported by said members; a cultivator attachment for the tractor including a depending supporting frame secured to the chassis, front and rear rock shafts extending transversely of the tractor between the side frames carried by the supporting frame, cultivator teeth secured to said shafts, means for manually rocking said shafts, said shafts being arranged on opposite sides of the suspension members and the teeth carried by the front shaft being below and in front of said suspension member.

3. In a tractor of the track laying type having a chassis including laterally extending front suspension members and side track carrying frames supported by said members; a cultivator attachment for the tractor including a depending supporting frame secured to the chassis, front and rear rock shafts extending transversely of the tractor between the side frames carried by the supporting frame, cultivator teeth secured to said shafts, linkage pivoted to said rock shafts and to an upstanding hand lever for manually rocking said shafts, said shafts being arranged on opposite sides of the suspension members, the teeth carried by the front rock shaft being below and in front of said suspension member, rear cultivator teeth arranged directly in back of the side track carrying frames, means rockably supporting said rear teeth from said side frames and means operatively connecting the rear teeth with the rock shafts for synchronous movement therewith.

4. In a tractor of the track laying type including a chassis supported intermediately of track carrying side frames by laterally extending rear axles and laterally extending forward arms secured to the chassis adjacent the turning pivot point of the tractor, the combination therewith of a depending cultivator frame suspended from the forward arms on either side of the tractor chassis, spaced crank shafts pivotally mounted at the front and rear of said frame, curved cultivator teeth secured to the crank shafts and a manually operated linkage mechanism for rotating said crank shafts.

5. A cultivator as claimed in claim 4 wherein the said crank shafts are spaced apart on either side of the said forward laterally extending arms supporting the tractor chassis and are connected to each other by means of links pivoted to the crank portions of each crank shaft whereby the curved teeth secured to the shafts are moved in unison.

6. A cultivator as claimed in claim 4 wherein the combination includes auxiliary frames secured to and extending beyond the rear of each track side frame, the arms of each of said auxiliary frames carrying a pivoted cultivator tooth therebetween mounted on a rotary shaft, the rotary shafts of each auxiliary frame being connected by pivoted links to the spaced crank shafts whereby the teeth in said auxiilary frames are moved in unison with the teeth on said spaced crank shafts.

GEORGE DOUGLAS JONES.
EDWARD D. FISHER.